(12) United States Patent
Whitten et al.

(10) Patent No.: US 11,775,019 B2
(45) Date of Patent: *Oct. 3, 2023

(54) CASE AND MOUNT SYSTEM FOR HANDHELD ELECTRONIC DEVICE

(71) Applicant: ROKFORM IP LLC, Irvine, CA (US)

(72) Inventors: Jeff Whitten, Irvine, CA (US); Bernhard Leitner, Mission Viejo, CA (US); Craig Erion, Lemon Heights, CA (US)

(73) Assignee: RokForm IP LLC, Irvine, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/118,371

(22) Filed: Dec. 10, 2020

(65) Prior Publication Data

US 2021/0188380 A1    Jun. 24, 2021

Related U.S. Application Data

(63) Continuation of application No. 16/149,978, filed on Oct. 2, 2018, now Pat. No. 10,864,956, which is a
(Continued)

(51) Int. Cl.
*G06F 1/16* (2006.01)
*A45C 11/00* (2006.01)
(Continued)

(52) U.S. Cl.
CPC ............ *G06F 1/1656* (2013.01); *A45C 11/00* (2013.01); *B62J 9/21* (2020.02); *F16B 1/00* (2013.01);
(Continued)

(58) Field of Classification Search
CPC ................ A45C 2011/001–003; B62J 7/06
(Continued)

(56) References Cited

U.S. PATENT DOCUMENTS

| 3,179,367 A | 4/1965 | Rapata |
| 3,986,780 A | 10/1976 | Nivet |

(Continued)

FOREIGN PATENT DOCUMENTS

| AU | 201817027 S | 1/2019 |
| AU | 201817028 S | 1/2019 |

(Continued)

OTHER PUBLICATIONS

International Search Report and Written Opinion re International Application No. PCT/US2013/021474 dated Apr. 2, 2013, in 12 pages.
(Continued)

*Primary Examiner* — Anthony D Stashick
*Assistant Examiner* — Raven Collins
(74) *Attorney, Agent, or Firm* — Knobbe, Martens, Olson & Bear, LLP

(57) ABSTRACT

A protective case for a handheld electronic device is provided. The protective case can include a removable mounting system comprised of an interlocking member and a plurality of mounting bases. The protective case may further include a non-slip member to prevent the device from slipping on a surface and a magnet for attaching the device to a magnetic surface.

17 Claims, 11 Drawing Sheets

Related U.S. Application Data continuation of application No. 15/838,933, filed on Dec. 12, 2017, now Pat. No. 10,093,377, which is a continuation of application No. 15/456,276, filed on Mar. 10, 2017, now Pat. No. 10,112,670, which is a continuation of application No. 15/188,751, filed on Jun. 21, 2016, now Pat. No. 9,592,871, which is a continuation of application No. 14/260,817, filed on Apr. 24, 2014, now Pat. No. 9,383,774, which is a continuation of application No. 13/593,220, filed on Aug. 23, 2012, now Pat. No. 8,708,151.

(60) Provisional application No. 61/653,618, filed on May 31, 2012, provisional application No. 61/585,933, filed on Jan. 12, 2012.

(51) Int. Cl.
*H04B 1/3888* (2015.01)
*B62J 9/21* (2020.01)
*F16B 1/00* (2006.01)
*F16B 3/00* (2006.01)
*F16B 47/00* (2006.01)
*F16M 13/02* (2006.01)
*B62J 45/00* (2020.01)

(52) U.S. Cl.
CPC .............. *F16B 3/00* (2013.01); *F16B 47/003* (2013.01); *F16M 13/022* (2013.01); *G06F 1/1633* (2013.01); *H04B 1/3888* (2013.01); *A45C 2011/001* (2013.01); *A45C 2011/002* (2013.01); *A45C 2011/003* (2013.01); *B62J 45/00* (2020.02); *F16B 2001/0035* (2013.01); *G06F 2200/1633* (2013.01)

(58) Field of Classification Search
USPC ....................................................... 206/320
See application file for complete search history.

(56) References Cited

U.S. PATENT DOCUMENTS

| | | | |
|---|---|---|---|
| D564,754 S | 3/2008 | Tages et al. | |
| 7,374,142 B2 | 5/2008 | Carnevali | |
| 7,523,906 B2 | 4/2009 | Bennett | |
| D606,738 S | 12/2009 | Hofer et al. | |
| 7,652,888 B2 | 1/2010 | Bohlinger et al. | |
| 7,685,904 B2 | 3/2010 | Cutsforth | |
| D627,771 S | 11/2010 | Smith et al. | |
| 7,930,006 B2 | 4/2011 | Neu et al. | |
| D646,672 S | 10/2011 | Fathollahi | |
| D647,085 S | 10/2011 | Chung et al. | |
| D653,190 S | 1/2012 | Richter | |
| D654,043 S | 2/2012 | Pan et al. | |
| 8,167,127 B2 | 5/2012 | Martin et al. | |
| 8,172,247 B2 | 5/2012 | Weber et al. | |
| 8,267,418 B1 | 9/2012 | Chuang | |
| 8,317,067 B2 | 11/2012 | Lewis | |
| D671,932 S | 12/2012 | Azoulay | |
| 8,439,239 B2 | 5/2013 | Lee | |
| 8,469,245 B2 | 6/2013 | Gregory et al. | |
| D685,362 S | 7/2013 | Murchison et al. | |
| D685,363 S | 7/2013 | Murchison et al. | |
| D685,785 S | 7/2013 | Seoc et al. | |
| D687,004 S | 7/2013 | Behling | |
| 8,490,789 B2 | 7/2013 | Lach et al. | |
| 8,544,644 B2 | 10/2013 | Meehan | |
| D697,060 S | 1/2014 | Yang | |
| 8,708,151 B2 | 4/2014 | Whitten et al. | |
| D711,886 S | 8/2014 | Kerawala et al. | |
| 8,800,763 B2 | 8/2014 | Hale | |
| 8,830,663 B2 | 9/2014 | Child et al. | |
| D718,290 S | 11/2014 | Whitten et al. | |
| 8,936,222 B1 | 1/2015 | Bastian et al. | |
| D725,119 S | 3/2015 | Gaylord | |
| D726,170 S | 4/2015 | Ng | |
| D726,732 S | 4/2015 | Lay et al. | |
| D739,857 S | 9/2015 | Lay et al. | |
| 9,185,953 B2 | 11/2015 | Whitten et al. | |
| 9,243,739 B2 | 1/2016 | Peters | |
| 9,383,774 B2 | 7/2016 | Whitten et al. | |
| 9,402,016 B1 | 7/2016 | Hidalgo | |
| 9,498,034 B2 | 11/2016 | Whitten et al. | |
| 9,592,871 B2 | 3/2017 | Whitten et al. | |
| 9,616,821 B2 | 4/2017 | Elharar | |
| 9,700,114 B2 | 7/2017 | Whitten et al. | |
| 10,070,707 B2 | 9/2018 | Whitten et al. | |
| 10,093,377 B2 | 10/2018 | Whitten et al. | |
| 10,112,670 B2 | 10/2018 | Whitten et al. | |
| 10,122,400 B2 | 11/2018 | Tiller et al. | |
| 10,326,488 B2 | 6/2019 | Wojcik | |
| D852,681 S | 7/2019 | Peters et al. | |
| 10,420,407 B2 | 9/2019 | Whitten et al. | |
| 10,864,956 B2 | 12/2020 | Whitten et al. | |
| 11,044,974 B2 | 6/2021 | Whitten et al. | |
| 2002/0139822 A1 | 10/2002 | Infanti | |
| 2004/0204169 A1 | 10/2004 | Goradesky | |
| 2006/0147080 A1 | 7/2006 | Wilson et al. | |
| 2006/0229740 A1* | 10/2006 | Kreisel | H02H 3/006 700/22 |
| 2007/0014120 A1 | 1/2007 | Kitamura | |
| 2007/0174187 A1 | 7/2007 | Altberg et al. | |
| 2007/0212931 A1 | 9/2007 | Livingston | |
| 2007/0221694 A1 | 9/2007 | Aguiliar et al. | |
| 2008/0023508 A1* | 1/2008 | Harchol | A45F 5/02 224/183 |
| 2008/0251512 A1* | 10/2008 | Griffin | H04B 1/3888 220/4.02 |
| 2008/0314941 A1 | 12/2008 | Knych et al. | |
| 2010/0084527 A1 | 4/2010 | Lau et al. | |
| 2011/0043086 A1 | 2/2011 | Cui et al. | |
| 2011/0143583 A1 | 6/2011 | Zilmer et al. | |
| 2011/0227735 A1* | 9/2011 | Fawcett | G08B 13/149 340/568.8 |
| 2012/0298820 A1 | 11/2012 | Manolidis | |
| 2013/0292270 A1 | 11/2013 | Lach et al. | |
| 2013/0292296 A1 | 11/2013 | Kang et al. | |
| 2014/0287800 A1 | 9/2014 | Ho | |
| 2014/0355200 A1 | 12/2014 | Thiers | |
| 2015/0189963 A1 | 7/2015 | Lai et al. | |
| 2015/0201723 A1 | 7/2015 | Rayner et al. | |
| 2016/0192752 A1 | 7/2016 | Lach et al. | |
| 2017/0183052 A1 | 6/2017 | Whitten et al. | |
| 2018/0099714 A1 | 4/2018 | Whitten et al. | |
| 2021/0261215 A1 | 8/2021 | Whitten et al. | |
| 2021/0315340 A1 | 10/2021 | Whitten et al. | |
| 2022/0117384 A1 | 4/2022 | Whitten | |

FOREIGN PATENT DOCUMENTS

| | | |
|---|---|---|
| AU | 201817029 S | 1/2019 |
| CN | 303239699 S | 6/2015 |
| CN | 204785421 U | 11/2015 |
| DE | 20 2004 017 041 U1 | 3/2005 |
| EM | 005832789 | 1/2019 |
| EM | 005832813 | 1/2019 |
| EM | 005832854 | 3/2019 |
| WO | WO 2013/106849 | 7/2013 |

OTHER PUBLICATIONS

Bicio—GoRide—Bike Mount for iPhone 3G/3GS, http://www.bicio.com/GoRide_iphoneBikeMount.php, accessed via web archive, dated Nov. 29, 2011.
Bicio—GoRide Product page depicting an iPhone Bike Mount and Base Mount, http://www.bicio.com/category-bike.php, accessed via web archive, dated Dec. 8, 2011.
Bicio—GoRide iPhone Bike Mount, http://www.bicio.com/GoRide_iphoneBase.php, accessed via web archive, dated Apr. 16, 2011.

(56) References Cited

OTHER PUBLICATIONS

The Wallee—Features page depicting iPad hard case and wall plate, http://thewallee.com/site/about ("features" tab), accessed via web archive, dated Jan. 8, 2011.

The Wallee—Technical Specifications page depicting iPad hard case and wall plate, http://thewallee.com/site/about ("tech specs" tab), accessed via web archive, dated Jan. 8, 2011.

"The Wallee Wall Mount + Hard Case System for iPad", The Gadgeteer (Jul. 29, 2010), available at http://the-gadeeteer.com/2010/07/29/the-wallee-wall-mount-hard-case-system-for-ipad/.

Donovan, Thomas J., Letter to counsel for Applicant, Dec. 8, 2017.

The Wallee iPad Case and Wall Mount, https://web.archive.org/web/20110108191535/http://thewallee.com/#, in 89 pages.

Welcome to iBikeMount.com—The Bike Mount Solution for iPho . . . , https://web.archive.org/web/20090721175904/http://www.ibikemount.com:80/index.html, in 20 pages.

Donovan, Thomas J., Letter to counsel for Applicant, dated Mar. 15, 2018, and accompanying exhibits to letter.

\* cited by examiner

CASE AND MOUNT SYSTEM FOR HANDHELD ELECTRONIC DEVICE

INCORPORATION BY REFERENCE TO ANY PRIORITY APPLICATIONS

The present application claims priority benefit under 35 U.S.C. § 120 to and is a continuation of U.S. patent application Ser. No. 16/149,978, filed Oct. 2, 2018, entitled "CASE AND MOUNT SYSTEM FOR HANDHELD ELECTRONIC DEVICE," which is a continuation of U.S. patent application Ser. No. 15/838,933, filed Dec. 12, 2017, entitled "CASE AND MOUNT SYSTEM FOR HANDHELD ELECTRONIC DEVICE," now U.S. Pat. No. 10,093,377, which is a continuation of U.S. patent application Ser. No. 15/456,276, filed Mar. 10, 2017, entitled "CASE AND MOUNT SYSTEM FOR HANDHELD ELECTRONIC DEVICE," now U.S. Pat. No. 10,112,670, which is a continuation of U.S. patent application Ser. No. 15/188,751, filed Jun. 21, 2016, entitled "CASE AND MOUNT SYSTEM FOR HANDHELD ELECTRONIC DEVICE," now U.S. Pat. No. 9,592,871, which is a continuation of U.S. patent application Ser. No. 14/260,817, filed Apr. 24, 2014, entitled "CASE AND MOUNT SYSTEM FOR HANDHELD ELECTRONIC DEVICE," now U.S. Pat. No. 9,383,774, which is a continuation of U.S. patent application Ser. No. 13/593,220, filed Aug. 23, 2012, entitled "CASE AND MOUNT SYSTEM FOR HANDHELD ELECTRONIC DEVICE," now U.S. Pat. No. 8,708,151, which claims priority benefit under 35 U.S.C. § 119 from U.S. Provisional Application Nos. 61/585,933, filed Jan. 12, 2012, entitled "PHONE CASE AND MOUNT SYSTEM" and 61/653,618, filed May 31, 2012, entitled "CASE AND MOUNT SYSTEM FOR HANDHELD ELECTRONIC DEVICE." The entirety of each of the above-identified applications is hereby incorporated by reference herein and made a part of the present disclosure.

BACKGROUND

Field

The invention relates generally to protective cases for handheld electronic devices.

Description of the Related Art

Handheld and/or portable electronic devices (e.g., digital media players, phones, smartphones, tablet computers, handheld readers, and similar devices) are becoming important and common tools. These tools are constantly in use, both at home and on the go.

However, with this frequency and variety of use comes the problem of proper protection. Without proper protection, a device may become damaged due to being dropped or by falling from an unsecured position. This damage may be permanent and cause loss of data or information and high replacement costs.

SUMMARY

In at least one embodiment, the present application relates to a protective system for a handheld electronic device that overcomes the shortcomings of the prior art noted above.

In some embodiments, a protective system for a handheld electronic device is disclosed. The protection system comprises a shell comprised of a rear wall, a plurality of wall surfaces arranged to enclose a plurality of peripheral edges of a handheld electronic device, and an outer surface. The rear wall further defines an attachment region designed to receive an interlocking member and a non-slip region designed to receive a non-slip member. The attachment region comprises a first open space, an inner interlocking surface and an outer interlocking surface, both the interlocking surfaces surrounding the first open space, the inner interlocking surface being located above the plane of the outer surface of the rear wall and wherein the inner and outer interlocking surfaces are radially offset to provide an interlocking area. The interlocking member comprises a plate having a plurality of engaging members generally located at right angles, the engaging members being configured to interact with the inner and outer interlocking surfaces such that in an interlocked position each of the engaging members is disposed within the interlocking area. The interlocking member further comprises at least one mounting base. The non-slip region comprises a second open space and a recessed surface formed by the disposition of a small diameter opening within a larger diameter opening. The non-slip member comprises a non-slip material shaped to fit within the second open space, the non-slip member having a circumferential groove dividing the non-slip member into a gripping surface and an interior surface, the interior surface having a greater diameter than the gripping surface, the groove in the non-slip member engaging with the recessed surface to attach the non-slip member to the shell. The non-slip member further comprises an indentation on the interior surface designed to incorporate a magnet.

1. An embodiment involves a protection system for a handheld electronic device, including a shell comprising a rear wall and a side wall extending from the rear wall, wherein, in use, the side wall encloses a plurality of peripheral edges of an associated handheld electronic device. The rear wall further comprises an inner surface and an outer surface. The rear wall defines an attachment region designed to receive an interlocking member and a non-slip region designed to receive a non-slip member. The attachment region comprises a first open space, a first interlocking surface and a second interlocking surface. Both of the first and second interlocking surfaces surrounding at least a portion of the first open space. The first and second interlocking surfaces are located behind the inner surface of the rear wall with the first interlocking surface being located substantially in a first plane and the second interlocking surface having at least a portion that extends substantially perpendicular to the first plane. The first interlocking surface is circumferentially offset from at least a portion of the second interlocking surface to provide an interlocking area. The interlocking member comprises a plate portion having at least one engagement member that, in use, is passed through the first open space and disposed within the interlocking area to achieve an interlocked position between the interlocking member and the shell. The interlocking member further comprises at least one mounting base. The non-slip region comprises a second open space and a recessed surface formed by the disposition of a smaller opening within a larger opening. The non-slip member comprises a non-slip material shaped to fit within the second open space. The non-slip member has a peripheral groove that, in use, engages the recessed surface to attach the non-slip member to the shell. The non-slip member further comprises an indentation within an interior surface that, in use, faces the associated handheld electronic device. A magnet is received within the indentation of the non-slip member.

2. The system of paragraph 1, wherein the shell further comprises at least one access opening that allows access to control features of the handheld electronic device.

3. The system of paragraph 1, wherein the non-slip member is disposed outwardly of the outermost portion of the outer surface of the rear wall of the shell.

4. The system of paragraph 1, wherein the mounting base further comprises an adhesive layer that, in use, attaches to a mounting surface via adhesion.

5. The system of paragraph 1, wherein the interlocked position is achieved by rotation of the interlocking member within the attachment region.

6. An embodiment involves a protection system for a handheld electronic device, including a shell comprising a rear wall and a side wall extending from the rear wall, wherein, in use, the side wall encloses a plurality of peripheral edges of an associated handheld electronic device. The rear wall further comprises an inner surface and an outer surface. The rear wall defines an attachment region designed to receive an interlocking member and a non-slip region designed to receive a non-slip member. The attachment region comprises a first open space and a plurality of interlocking surface portions, and each of the interlocking surface portions including a retaining surface and a stop surface that cooperate to provide an interlocking area. The interlocking member comprises a plurality of engaging members, each of which are configured to interact with one of the plurality of interlocking surface portions such that, in an interlocked position, each of the plurality of engaging members is disposed within one of the plurality of interlocking areas. The non-slip region comprises a second open space and a recessed surface formed by the disposition of a smaller opening within a larger opening. The non-slip member comprises a non-slip material shaped to fit within the second open space, the non-slip member having a peripheral groove that, in use, engages the recessed surface to attach the non-slip member to the shell.

7. The system of paragraph 6, wherein the shell further comprises at least one access opening that allows access to control features of a handheld electronic device.

8. The system of paragraph 6, further comprising a magnet disposed within the non-slip member.

9. The system of paragraph 6, further comprising at least one mounting base attached to the interlocking member.

10. The system of paragraph 9, wherein the mounting base comprises an adhesive layer that allows the mounting base to be affixed to a surface through adhesion.

11. An embodiment involves a protection system for a handheld electronic device, which includes a shell comprising a rear wall and a side wall extending in a first direction from the rear wall, wherein, in use, the side wall encloses a plurality of peripheral edges of an associated handheld electronic device. The rear wall comprises a first surface facing in the first direction and a second surface facing in a second direction opposite the first direction. The rear wall comprises an opening extending through the second surface. The opening defines at least one shell interlock surface. The system also includes a mount having at least one mount interlock surface, wherein, in use, a portion of the mount is passed through the opening of the shell and the at least one shell interlock surface is engaged with the at least one mount interlock surface to selectively couple the shell to the mount.

12. The protection system of paragraph 11, wherein the mount comprises an adhesive layer that permits the mount to be secured to a surface via adhesion.

13. The protection system of paragraph 11, wherein the mount is a bike mount that, in use, is mounted to a component of a bicycle.

14. The protection system of paragraph 13, wherein the bike mount comprises a cap portion that, in use, is secured to a steerer tube of the bicycle.

15. The protection system of paragraph 14, further comprising an arm portion that extends between the cap portion and the at least one mount interlock surface, wherein the arm portion is rotatably adjustable relative to the cap portion.

BRIEF DESCRIPTION OF THE DRAWINGS

These and other features, aspects, and advantages of the present invention will now be described in connection with a preferred embodiment of the present invention, in reference to the accompanying drawings. The illustrated embodiments, however, are merely examples and are not intended to limit the invention.

DETAILED DESCRIPTION

The following detailed description is directed to certain specific embodiments of the invention. However, the invention may be embodied in a multitude of different ways as defined and covered by the claims.

Embodiments of the invention can provide the features of a protection system for a portable or handheld electronic device (hereinafter "handheld electronic device"). Some embodiments of the invention desirably may incorporate an attachment region for attaching a removable mounting member preferably able to support the handheld electronic device within the protection system and affix to a variety of surfaces. Other embodiments of the invention may also incorporate an anti-slip surface wherein a magnet is disposed for attachment of the device to magnetic surfaces and slip prevention.

A preferred embodiment of the present invention comprises a shell for rigidly securing and protecting a handheld electronic device. In a preferred embodiment, the shell may be in multiple pieces for ease of assembly around a handheld electronic device. The upper piece of the shell preferably provides an attachment region for a removable mounting member that can attach to various solid surfaces, such as but not limited to a desk, vehicle dashboard, mirror, etc. The shell preferably also incorporates an anti-slip insert in which a magnet is disposed, allowing for magnetic adherence to surfaces without interfering with the anti-slip benefit provided by the anti-slip insert. The shell preferably is formed using a material that is generally rigid and lightweight, such as but not limited to an injection molded polycarbonate or other suitable plastic material(s). Preferably, the shell comprises rigid sidewalls that surround an entirety or portions of the peripheral edges of the device. The sidewalls preferably are arranged to protect the device by absorbing incidental shock forces and/or inhibiting or preventing direct contact between the device and another object. The sidewalls also desirably contain various openings to allow access to the control buttons, inputs, and outputs of the handheld electronic device. The rear surface of the shell is preferably further designed with various openings to allow additional access to features of the handheld electronic device that may be located on the rear of the device (such as a camera) or to reduce the weight of the shell.

Figure 1:
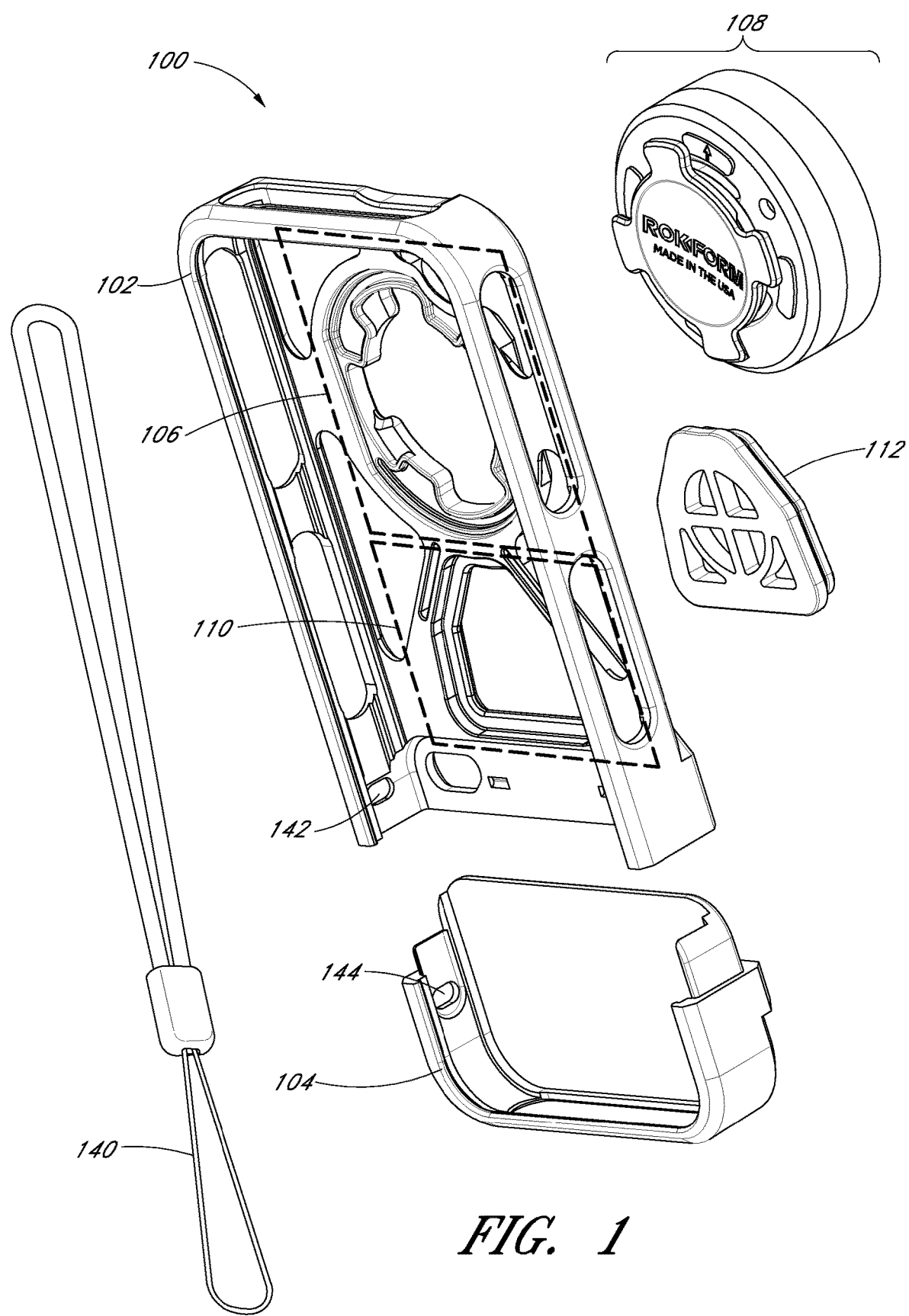
FIG. 1 is a perspective view of an exploded assembly of protective system for a handheld electronic device according to a preferred embodiment of the invention.

FIG. 1 depicts a preferred embodiment having certain features, aspects and advantages of the present invention. In FIG. 1, protection system 100 may include more, fewer or different components than those shown. Protection system 100 includes a body or shell that, in the illustrated arrangement, is comprised of an upper shell piece 102 and lower shell piece 104. Protection system 100 is shown in two pieces to facilitate installation of the protection system 100 on a handheld electronic device. Lower shell piece 104 is designed, in one embodiment, to fit together with upper shell piece 102 preferably using an interlocking or tab/slot attachment. However, in other arrangements, the upper shell piece 102 and lower shell piece 104 could be secured together with other arrangements (e.g., mechanical fasteners, such as screws) or could be portions of a unitary or single-piece shell in which installation of the electronic device is accomplished through another method, such as by deformation of the side walls or other portions of the shell to pass over the electronic device. Thus, references to the upper shell piece 102 or lower shell piece 104 herein are also intended to refer to the entire shell of an integrated or unitary shell arrangement.

Upper shell piece 102 preferably includes an attachment region 106 for attaching mounting member 108. The attachment region 106 contains an engagement structure that allows the upper shell piece 102 and, thus, the protection system 100 to be releasably attached the mounting member 108. A preferred engagement structure is described in greater detail below. As shown in FIG. 1 and FIGS. 9A-C, mounting member 108 may be comprised of an interlocking member 902 and at least one mounting base 904. As described further below and shown in FIG. 6, the mounting member 108 can also include one or more optional spacers, which could be similar or identical to the mounting base 904. Upper shell piece 102 also preferably includes a non-slip region 110, which includes a non-slip arrangement that enhances frictional engagement of protection system 100 with a surface on which the protection system 100 may be placed. In the illustrated arrangement, the non-slip region 110 incorporates an opening or cavity in the protection system 100 (e.g., the upper shell piece 102) into which non-slip member 112 may be inserted. As depicted more clearly in FIG. 8C, non-slip member 112 may also preferably comprise a rare earth magnet 802 in order to removably attach the handheld electronic device contained within protection system 100 to a magnetic surface.

Figure 11:
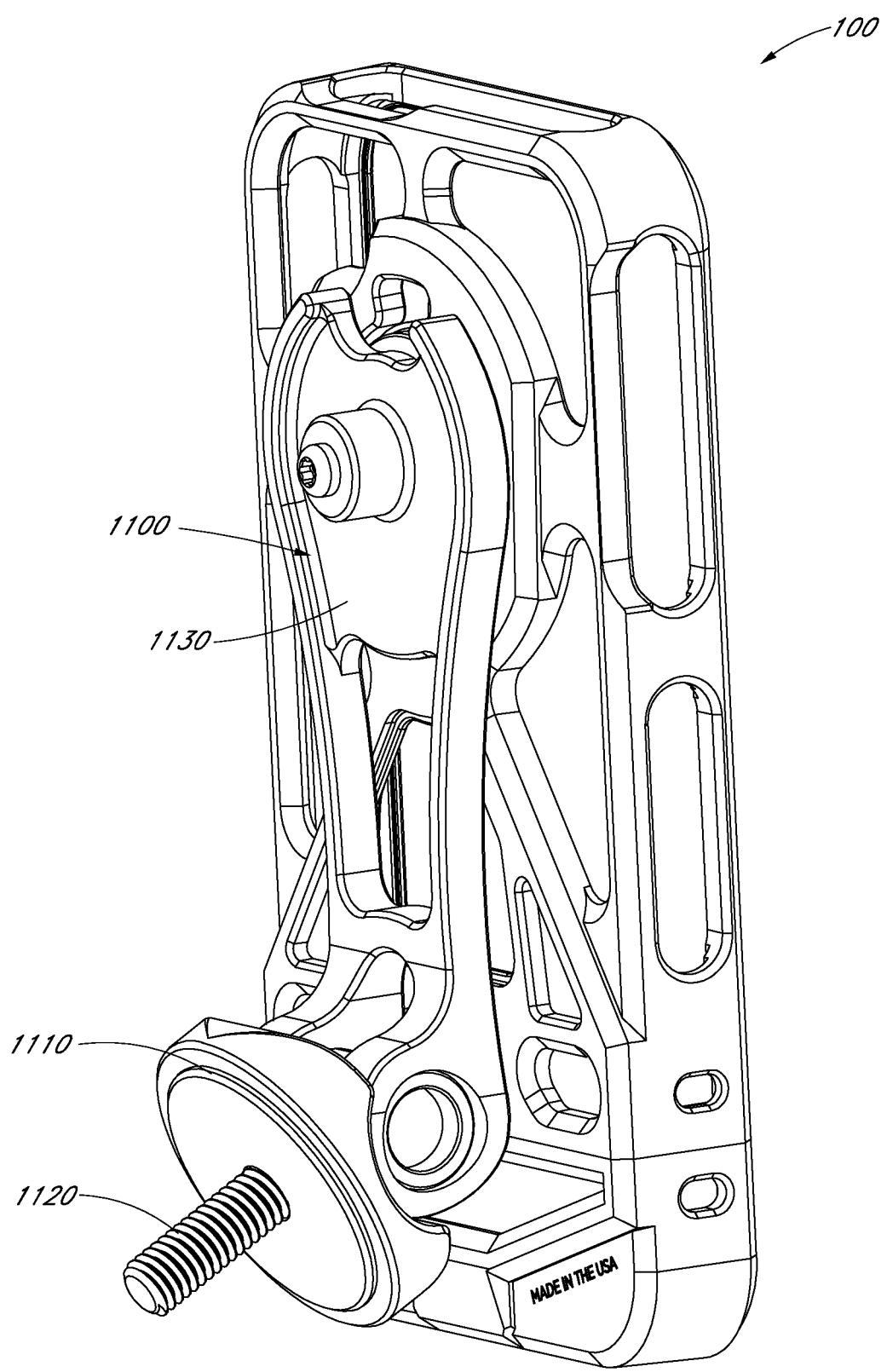
FIG. 11 is perspective view of the protective system secured to a bicycle mount.

FIG. 1 further depicts a preferred embodiment of the invention further comprising a lanyard 140, which may attach to protection system 100 to facilitate easy carrying and transport of a handheld electronic device. For example, the lanyard 140 can be looped through openings 142 and 144 on the upper shell piece 102 and lower shell piece 104, respectively. Additional accessories, not shown in FIG. 1, may be used with protection system 100. For example, one accessory that may be used with protection system 100 includes a bike mount, one embodiment of which is shown in FIG. 11. Another accessory that may be used with protection system 100 includes a tripod (not shown), which can support the protection system 100 and associated electronic device in a suitable position (e.g., portrait or landscape) preferably at an elevated position relative to a surface on which the tripod rest to take photographs or video. The accessory can be coupled to the protection system 100 via an interlocking arrangement the same as or similar to the mounting member 108 or via other suitable arrangements, such as the same as or similar to the lanyard 140 arrangement. In addition to the lanyard 140, bike mount and tripod, other types of accessories can also be provided, such as adjustable or non-adjustable stands, mounting or securing clip arrangements, etc.

As shown in FIGS. 1-4, the assembled upper shell piece 102 and lower shell piece 104 of the protection system 100 together define an interior region or space in which a handheld electronic device may be enclosed. Each of the upper shell piece 102 and the lower shell piece 104 has a rear wall portion 200 that defines an interior rear surface 202 positioned adjacent the back surface of an electronic device placed in the protection system 100. The upper shell piece 102 and the lower shell piece 104 also include at least one or a plurality of enclosing edges to surround the sides of a handheld electronic device and provide protection for the handheld electronic device. In the illustrated arrangement, the enclosing edges are defined by a sidewall portion 150 that extends from the rear wall portion 200. The illustrated sidewall portion 150 extends along an entire periphery of the rear wall portion 200. As described above, however, the sidewall portion 150 is not necessarily solid or continuous, but can include one or more openings configured to allow access to controls or other components or features of the handheld electronic device, or simply to reduce weight. In alternative arrangements, the sidewall portion 150 can be constructed of one or several distinct sidewall portions, such as four corner portions, for example. A forward wall portion is spaced from the rear wall portion 200 by the sidewall portion 150. The forward wall portion defines a forward interior surface that is positioned adjacent a forward surface of the handheld electronic device placed in the protection system 100. In the illustrated arrangement, the forward wall portion is defined by a lip 152 that extends in an inward direction from the sidewall portion 150. Preferably, the lip 152 extends around the entire periphery of the rear wall portion 200. However, in other arrangements, the lip 152 can extend only around a portion of the periphery, which can be the same portion or a different portion than the portion surrounded by the sidewall portion 150. As discussed above, the upper shell piece 102 and lower shell piece 104 can be unitarily-formed. Accordingly, the sidewall portion 150 and/or lip 152 could be unitary, as well.

Figure 2:
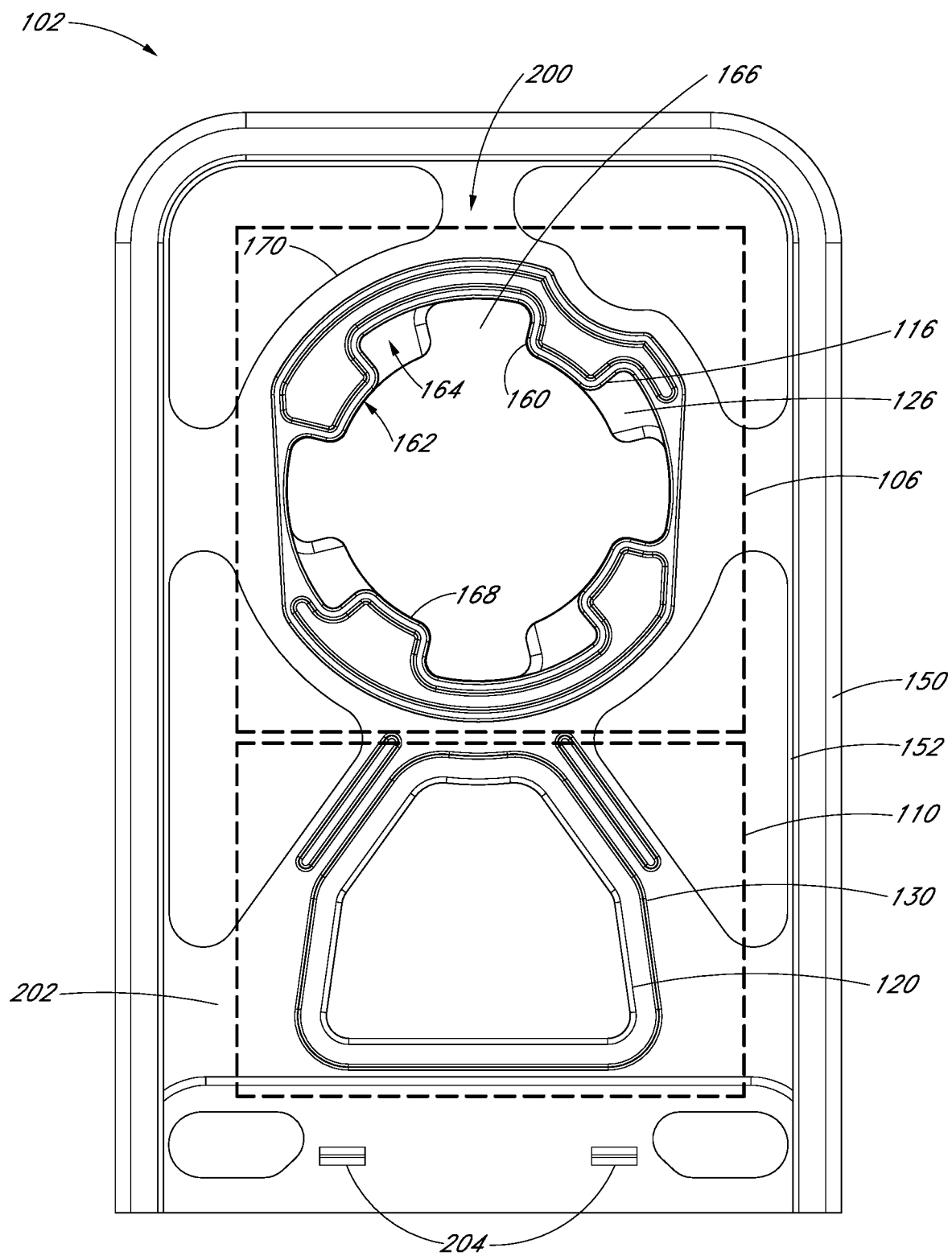
FIG. 2 is a view of the interior rear surface of a shell of the protective system.

As more clearly illustrated in FIG. 2, upper shell piece 102 also preferably includes an attachment region 106. The illustrated attachment region 106 defines an opening 160 in the interior rear surface 202 of upper shell piece 102. As described above, attachment region 106 is configured to allow attachment of mounting member 108 through an interlocking attachment that selectively secures the shell 102 to the mounting member 108 an inhibits or prevents removal in at least one direction. As pictured, attachment region 106 comprises at least one tab 162, each of which preferably defines two interlocking surfaces, 116 and 126. In the illustrated arrangement, the attachment region 106 includes four tabs 162; however, other numbers of tabs 162 could also be provided, such as two, three, five, six or more tabs 162. Interlocking surface 116 is disposed towards the interior rear surface 202 of upper shell piece 102, while interlocking surface 126 is disposed within a different plane than that defined by interlocking surface 116. Preferably, the interlocking surface 116 is perpendicular or substantially perpendicular to the interlocking surface 126. Preferably, the interlocking surface 116 is perpendicular or substantially perpendicular to the interior rear surface 202. The plane of interlocking surface 126 preferably is offset or disposed "below" the plane defined by the interior rear surface 202 or towards the outer rear surface of upper shell piece 102. In addition, preferably, the interlocking surface 116 is offset from at least a portion of the interlocking surface 126 in a circumferential direction to provide a space 164 in which a portion (e.g., tab 912) of the interlocking member 902 may be inserted. The opening 160 preferably also includes at least one access space 166 located beside or circumferentially offset from the at least one tab 162. Preferably, the number of access spaces 166 corresponds to the number of tabs 162. In the illustrated arrangement, four access spaces 166 are provided; however, the number of access spaces 166 can vary in the same manner as the number of tabs 162. Each of the tabs 912 of the interlocking member 902 can be inserted through one of the access spaces 166 and then turned to enter the space 164 and rest against the interlocking surfaces 116 and 126 to form an attachment with upper shell piece 102. Preferably, the access opening 166 is located on an opposite side of the interlocking surface 126 from the interlocking surface 116. In the illustrated arrangement, a circumferential dimension of the access opening 166 is smaller than a circumferential dimension of the tab 162 and can be approximately one-half of the circumferential dimension of the tab 162. The circumferential dimension of the space 164 is less than the circumferential dimension of the tab 162 and can be approximately one-half of the circumferential dimension of the tab 162. In the illustrated arrangement, the interlocking surface 116 is defined by a rib 168 that extends at least partially, and preferably entirely, around the opening 160. Preferably, the opening 160 passes completely through the upper shell piece 102 such that the surface of the associated electronic device is exposed through the opening 160. Such an arrangement advantageously minimizes the overall thickness of the protection system 100, while still providing the desired interlocking mount functionality. In an alternative arrangement, however, a rear wall portion can be provided to define a closed internal end of the opening 160, such that the rear wall portion is positioned in between the interlocking mount and the associated electronic device. Such an arrangement may increase the overall thickness of the protection system 100, but can also provide increased protection to the associated electronic device.

The interior rear surface 202 preferably also includes a non-slip region 110 within which a non-slip arrangement can be provided. For example, a non-slip member 112 may be inserted within the non-slip region 110 of the protective device 100. As shown, non-slip region 110 is comprised of a smaller opening 120 disposed within a larger opening 130. In the illustrated arrangement, the smaller opening 120 extends completely through the rear wall portion 200 and the larger opening 130 extends partially through the rear wall portion 200 from the interior rear surface 202. The recessed surface formed by the disposition of smaller opening 120 within larger opening 130 forms an interference surface to retain non-slip member 112 within the non-slip region 110. FIG. 2 shows one orientation of attachment region 106 and non-slip region 110, though other embodiments may include different orientations. A number of additional open spaces (generally 170) may be provided in the interior rear surface 202 of upper shell piece 102 for any of a number of reasons, including providing access to rear-mounted features of a handheld electronic device such as a camera, microphone, or speaker, or to reduce the weight of the protection system 100. Upper shell piece 102 may further comprise one or more of recesses 204 configured to accommodate one or more tabs 206 to facilitate attachment and retention of lower shell piece 104 to upper shell piece 102 to provide further protection for a handheld electronic device. In the illustrated arrangement, a pair of recesses 204 are located on the rear wall portion 200 of the upper shell piece 102 and a pair of tabs 206 are located on the rear wall portion 200 of the lower shell piece 104. However, in other arrangements, the recesses 204 and tabs 206 could be located elsewhere (e.g., sidewall 150 or front wall/lip 152) and/or could be provided in different numbers. In addition, the arrangement could be reversed such that the tabs 206 are provided on the upper shell piece 102 and the recesses 204 are provided on the lower shell piece 104.

Figure 3:
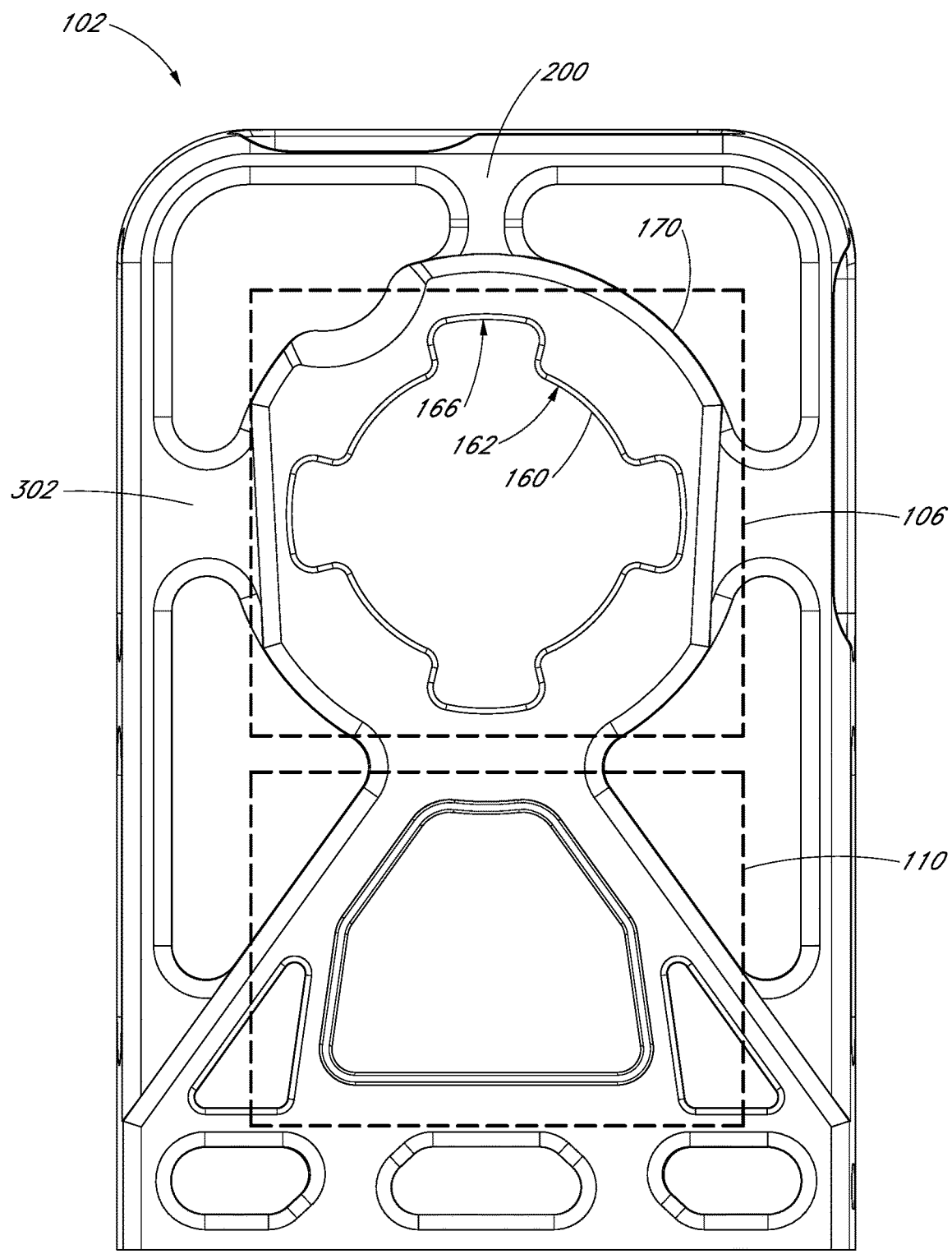
FIG. 3 is a view of the exterior rear surface of a shell of the protective system.

One embodiment of the exterior rear surface 302 of upper shell piece 102 is pictured in FIG. 3. The attachment region 106 as viewed from the rear of upper shell piece 102 is preferably disposed above or outwardly of the plane defined by at least a portion of the exterior rear surface 302, which can be a peripheral portion. In a preferred embodiment, the attachment region 106 has an opening 160 defined by a plurality of equally spaced radial lobes or tabs 162 designed to correspond with the tabs 912 of an interlocking member 902, more clearly viewed in FIGS. 9A and 9B. Mounting member 108 attaches to the exterior rear surface 302 side of the rear wall portion 200 of the upper shell piece 102 of protection system 100 preferably via an interlocking attachment. Once inserted, the tabs 912 of the interlocking member 902 may then rotate until further rotation is prevented by the interlocking surface 116, as seen in FIG. 2. After rotation, the tabs of interlocking member 902 will preferably be located adjacent to the interior side of interlocking surface 126 and against the edge of interlocking surface 116, forming an interlocking connection which preferably attaches mounting member 108 to the upper shell piece 102 of protection system 100.

Preferably, non-slip region 110 will also be disposed above the plane defined by exterior rear surface 302, as seen in FIG. 3. In the illustrated arrangement, when inserted, the non-slip member 112 will protrude outwardly as far as or further than any other rearward surface portion of the protection system 100 such that the non-slip member 112 will contact a surface upon which the protection system 100 is placed (assuming the surface is relatively flat or otherwise appropriately shaped) to accomplish a non-slip function.

Therefore, when non-slip member 112 is disposed within non-slip region 110, the non-slip surface will extend beyond at least the plane of exterior rear surface 302 to grip a surface and provide a non-slip feature.

Figure 4:
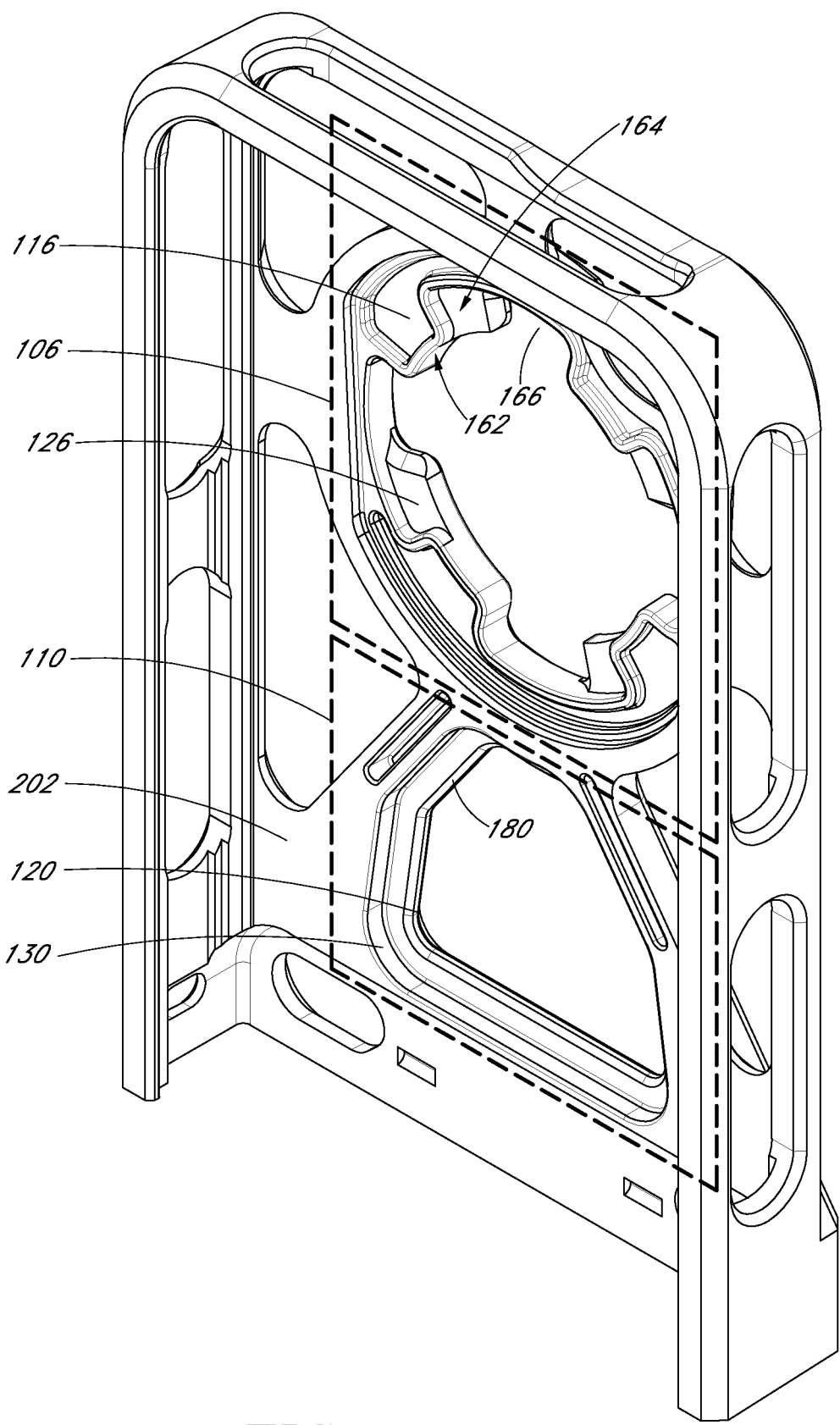
FIG. 4 is a perspective view of a shell of the protective system.

A perspective view of a preferred embodiment of upper shell piece 102 is pictured in FIG. 4. In this view, the different surfaces of attachment region 106 are more clearly visible. As described above with respect to FIG. 2, interlocking surface 116 is disposed towards the interior rear surface 202 of upper shell piece 102 relative to the interlocking surface 126, while interlocking surface 126 is disposed "below" the plane defined by interlocking surface 116, or towards the outer rear surface of upper shell piece 102. As is more clearly seen in FIG. 4, the interlocking surface 116 is circumferentially offset from the access opening 166 to provide the space 164 in which an interlocking member 902 may be inserted and then turned to form an attachment with upper shell piece 102. The rotation of the interlocking member 902 within attachment region 106 forms an interlocking connection with the upper shell piece 102. This interlocking connection is defined by the tabs 912 of the interlocking member 902 passing without obstruction into the defined areas (e.g., access openings 166) of attachment region 106 and then rotating against the interior surface of interlocking surface 126 until the tabs of interlocking member 902 are prevented from further rotation by encountering the interlocking surface 116. After rotation, the interior-facing surfaces of the interlocking member 902 and the interlocking surface 116 preferably will be substantially within the same plane.

FIG. 4 also more clearly depicts a preferred embodiment of the non-slip region 110 and openings 120 and 130. The smaller opening 120 is disposed within the larger opening 130. A small lip or ridge 180 is formed by the overlap of the two openings because the larger opening 130 is disposed towards the interior rear surface 202 of upper shell piece 102. Preferably, this lip or ridge 180 is disposed beneath the plane of the interior rear surface 202. The flexible non-slip member 112, such as that described in greater detail below with regard to FIGS. 8A-C, may be disposed within the non-slip region 110. An interior portion of the non-slip member 112 preferably has a greater diameter than the smaller opening 120 but also has a diameter sized to fit within larger opening 130. When inserted into the non-slip region 110, the larger diameter of the interior surface prevents the non-slip member 112 from falling out of the non-slip region 110. The smaller diameter of opening 120 will substantially prevent the non-slip member 112 from falling out of the non-slip region 110. The opening 120 defined by the non-slip region 110 will therefore allow a portion of the non-slip member 112 to contact a surface. The inclusion of the non-slip member 112 into protection system 100 provides non-slip properties and benefits to the protection system 100, such as preventing a handheld electronic device within the protection system from sliding off a smooth surface such as a desk or counter. The non-slip member 112 can include a peripheral recess 182 that is configured to receive the lip 180 to more securely hold the non-slip member 112 within the opening 120.

Figure 5:
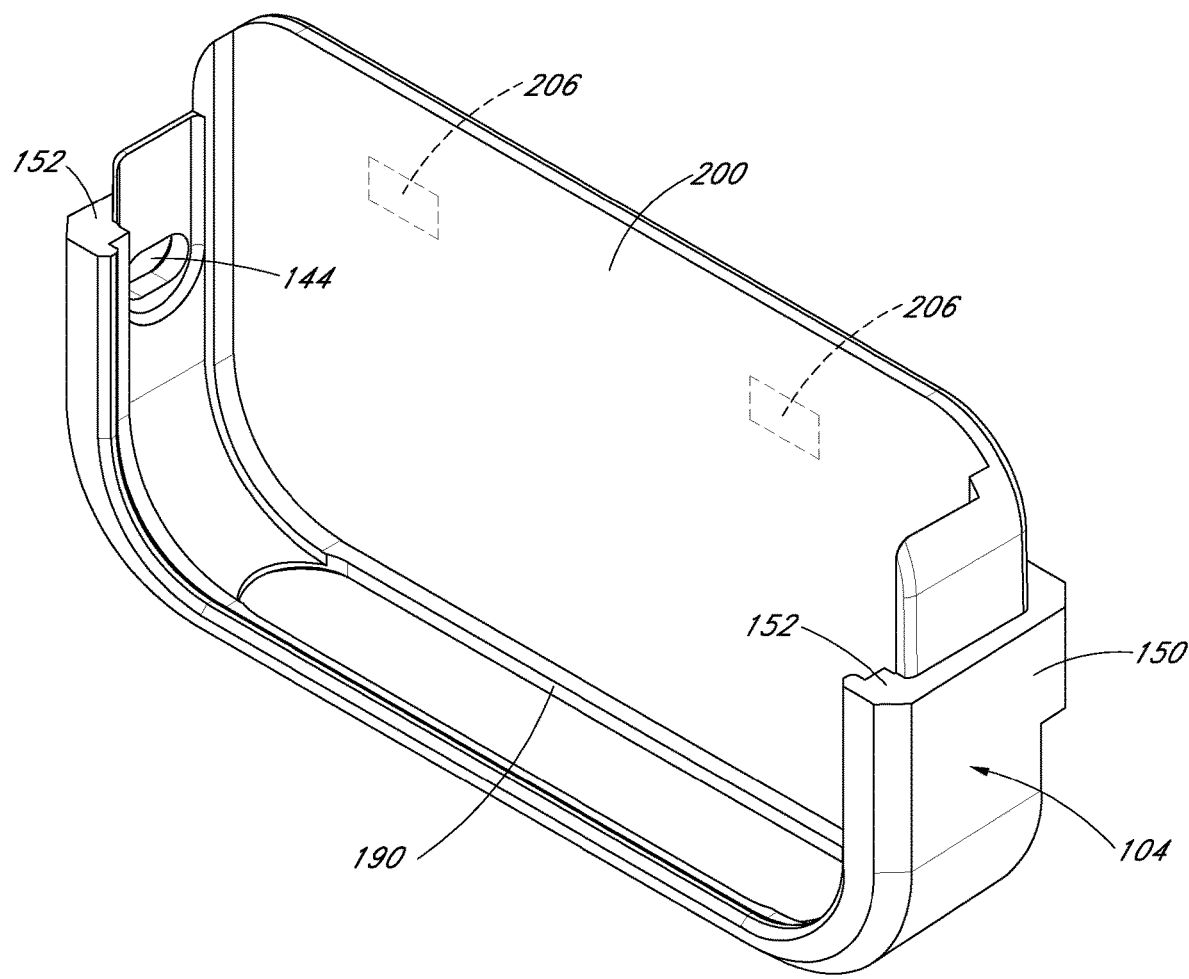
FIG. 5 is a perspective view of a lower shell of the protective system.

Lower shell piece 104 is shown in FIG. 5. In a preferred embodiment, lower shell piece 104 comprises an interior surface and side surfaces that surround the lower sides of a handheld electronic device to provide additional protection. Lower shell piece 104 preferably joins with upper shell piece 102 to provide protection around the sides and back of a handheld electronic device. The lower shell piece 104 can contain one or more openings to allow access to controls and ports on the handheld electronic device, such as a headphone jack or microphone jack. Furthermore, lower shell piece 104 also preferably contains an opening 190 to allow access to the charging area and/or microphone and speakers on the handheld electronic device such that the handheld electronic device does not need to be removed from protection system 102 in order to charge the device. FIG. 5 depicts only a preferred embodiment of the invention and other openings not shown may be included.

Figure 6:
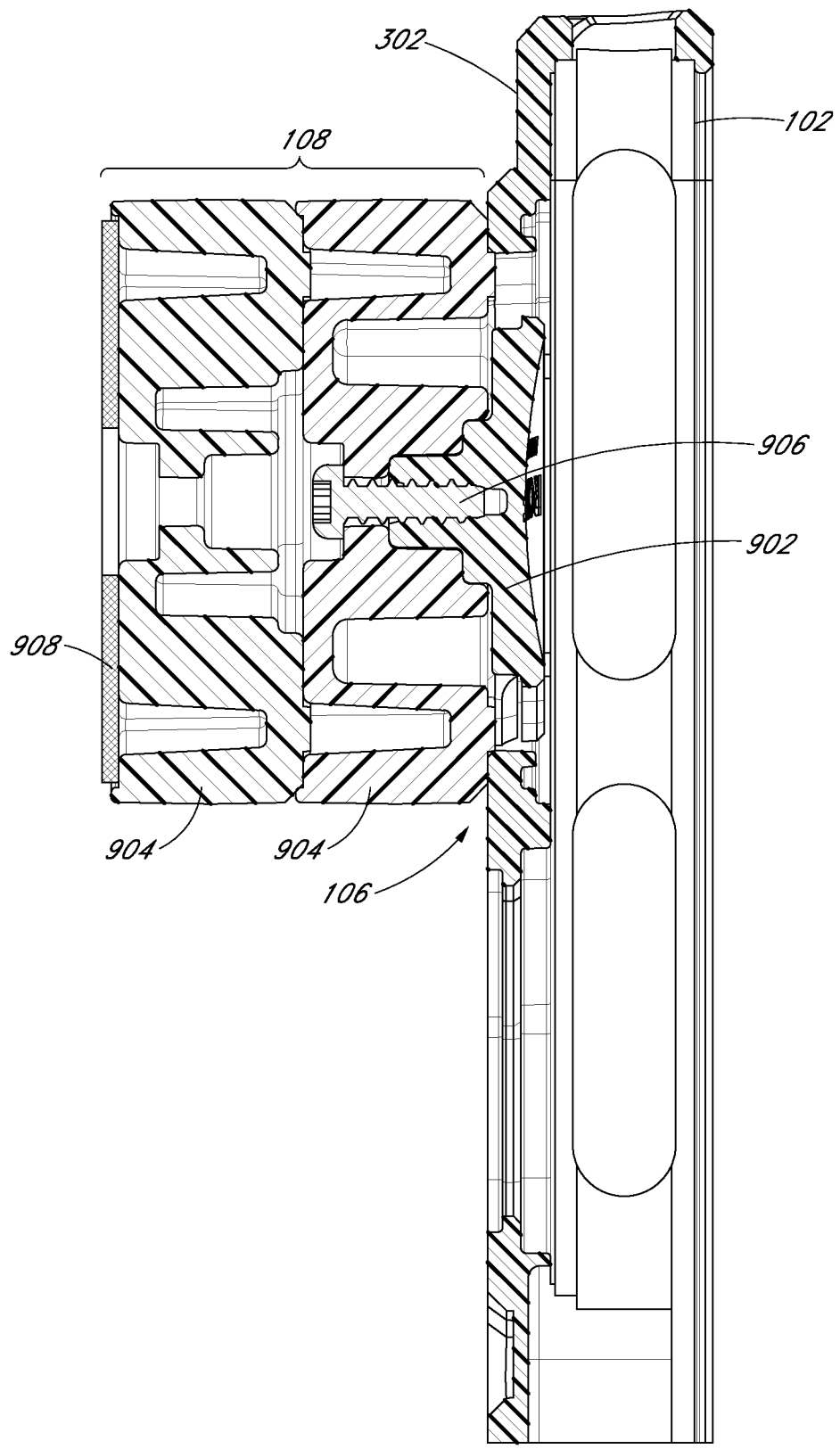
FIG. 6 is a cross sectional view of a shell of the protective system and a mounting member.

FIG. 6 illustrates a cross section of upper shell piece 102 and mounting member 108. In this figure, mounting member 108 is affixed to upper shell piece 102 in a preferred embodiment. As shown in this figure, the mounting member 108 is affixed to the rear surface of upper shell piece 102 within attachment region 106. Mounting member 108 extends out from the rear surface 302 of upper shell piece 102 such that protection system 100 may be mounted on a solid surface without being flush against the solid surface. The mounting member 108 depicted in the preferred embodiment is composed of two mounting pieces (e.g., mounting bases 904) joined together, along with an interlocking member 902. Mounting member 108 may be composed of greater or fewer mounting pieces joined together, depending on how far a user desires to mount the handheld electronic device from a solid surface. The interlocking member 902 of the mounting member 108 is joined to the interlocking member 902 preferably via a screw 906, but other forms of attachment may be used. The mounting bases 904 can be joined together by any suitable arrangement (e.g., snap-fit or mechanical fasteners) or the screw 906 could also hold the mounting bases 904 together in addition to securing the interlocking member 902 to the mounting base(s). If desired, an optional adhesive layer 908 can be provided on the rearward surface of the mounting member 108 to allow the mounting member 108 to be adhesively coupled to a desired surface.

Figure 7:
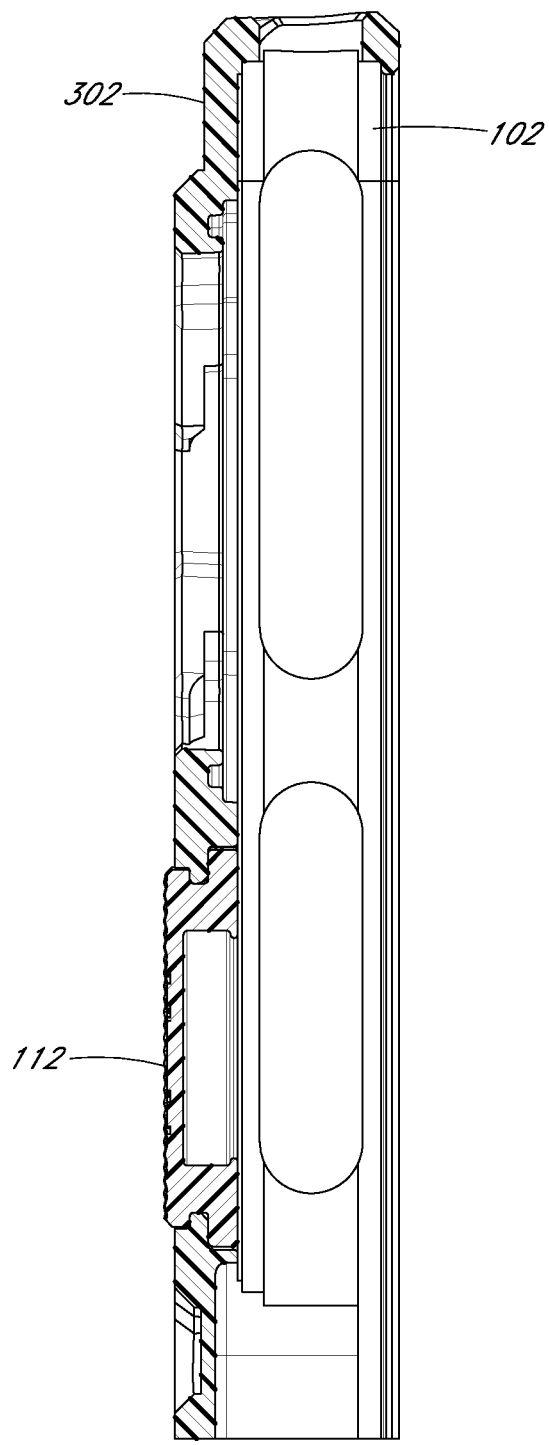
FIG. 7 is a cross sectional view of a shell of the protective system and a non-slip member.

A cross-sectional view of a preferred embodiment of protection system 100 containing non-slip member 112 is shown in FIG. 7. In the preferred embodiment shown, the non-slip surface of non-slip member 112 extends in a rearward direction at least as far and, preferably, beyond any other portion of exterior rear surface 302 of upper shell piece 102 (and lower shell piece 104) in order to provide a gripping surface to prevent a handheld electronic device from slipping on a solid surface. The non-slip member 112 also preferably contains a magnetic member, such as a rare-earth magnet 802, as further described below in regards to FIG. 8C. The magnet 802 is positioned or embedded within non-slip member 112 in order to provide a means of attaching protection system 100 to a magnetic surface without impacting the non-slip benefits provided by non-slip member 112 or scratching the surface.

Figure 8A:
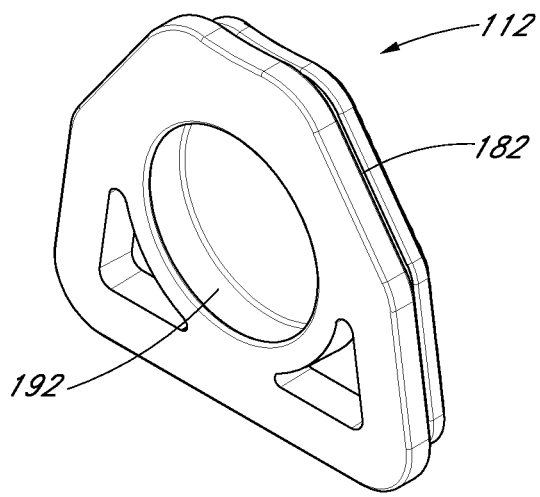
FIG. 8A is a perspective view of a non-slip member.
Figure 8B:
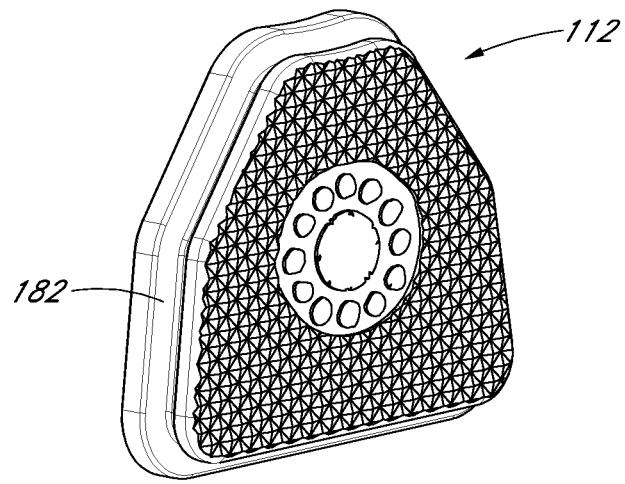
FIG. 8B is a second perspective view of a non-slip member.
Figure 8C:
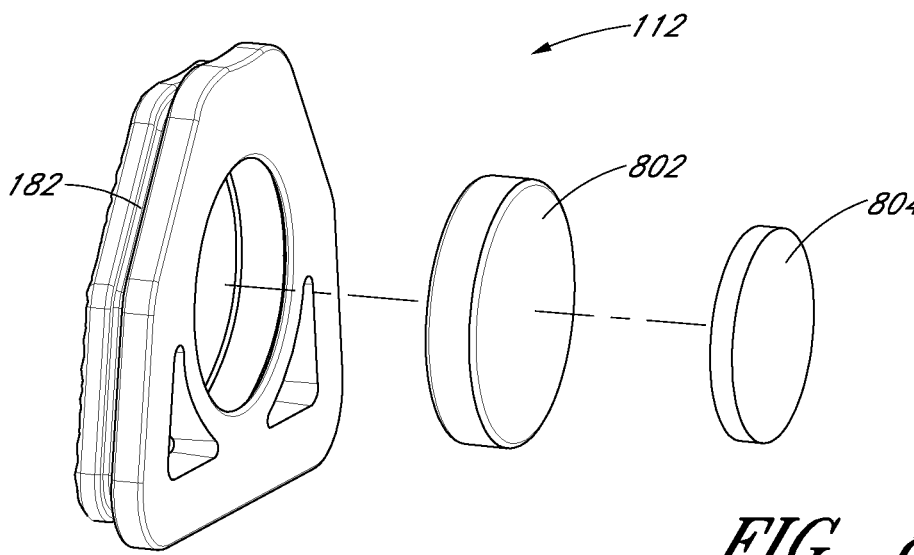
FIG. 8C is a perspective view of an exploded assembly of a non-slip member containing a rare-earth magnet and a magnet cover piece.

One preferred embodiment of a non-slip member 112 is shown in FIGS. 8A, 8B, and 8C. The non-slip member 112 is composed of a gripping outer surface shown in FIG. 8B and an interior-facing surface, as shown in FIG. 8A. This figure depicts a generally round or cylindrical indentation 192 into which a rare-earth magnet or other magnetic material may be placed without interfering with the non-slip benefits provided by non-slip member 112.

FIG. 8B depicts the exterior-facing surface of non-slip member 112. This figure more clearly illustrates the larger diameter of the interior-facing surface of non-slip member 112 versus the exterior-facing surface. These surfaces are separated by the groove or recess 182, which interacts with the smaller opening 120 in upper shell piece 102, as discussed above with regard to FIG. 4. As discussed above, the larger diameter of the interior surface prevents the non-slip member 112 from falling out of the non-slip region 110 because of interference between the larger diameter of the interior surface of non-slip member 112 and the smaller diameter of opening 120. The exterior surface of non-slip member 112 preferably has a ridged or roughened surface features in order to provide a better gripping surface and prevent the protection system from slipping on a solid surface. The exterior surface may also comprise different logos or other surface textures as desired.

The inclusion of rare-earth magnet 802 into non-slip member 112 is shown in FIG. 8C. This figure illustrates that the rare-earth magnet is preferably inserted into the indentation 192 on the interior surface of non-slip member 112. An optional cover piece 804 preferably made of the same material as non-slip member 112 can be placed on the interior-facing side of the rare-earth magnet 802 to provide a buffer between the magnet and the handheld electronic device within protection system 100.

Figure 9A:
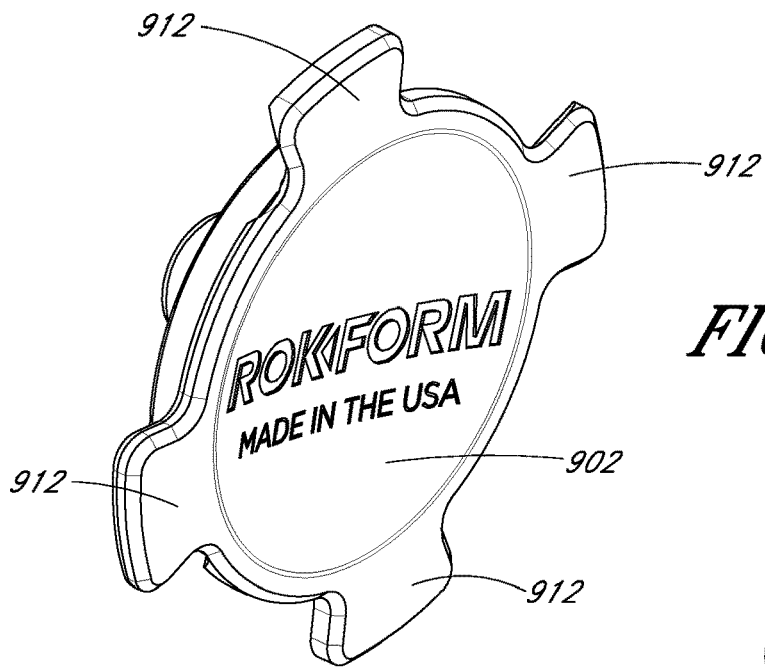
FIG. 9A is a perspective view of a first side of an interlocking member.
Figure 9B:
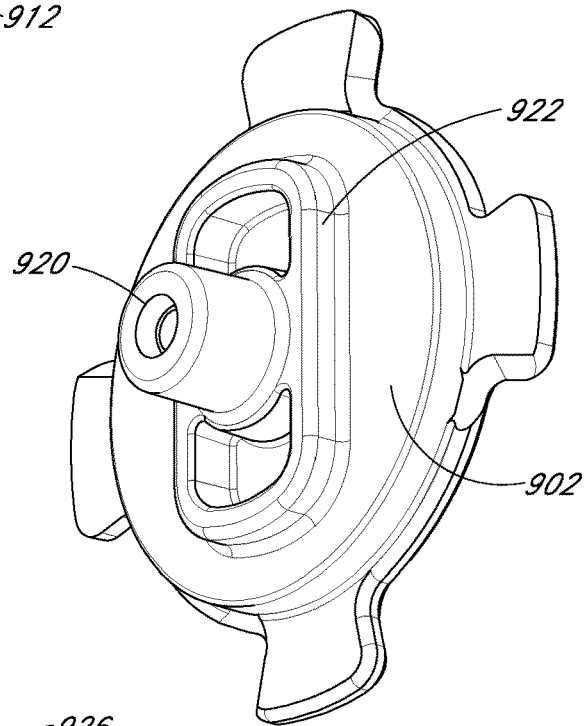
FIG. 9B is a second perspective view of a second side of the interlocking member.
Figure 9C:
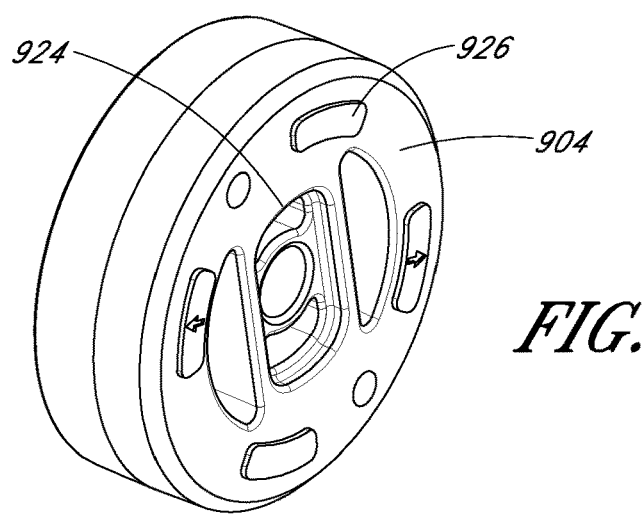
FIG. 9C is a perspective view of a mounting base.

FIGS. 9A-C illustrate one embodiment of the different components of mounting member 108. As shown in FIG. 9A, interlocking member 902 has a plurality of engaging members 912 located preferably at 90 degree intervals around the circumference of the interlocking member 902. This surface of interlocking member 902 may also display a logo or other information.

The connecting surface of interlocking member 902 is shown in FIG. 9B. Interlocking member 902 is attached to at least one mounting base 904, shown in FIG. 9C, preferably via a screw 906 (FIG. 6) received within a boss 920 of the interlocking member 902. However, other means of attachment may be used to connect the interlocking member 902 to at least one mounting base 904. Preferably, the interlocking member 902 and the mounting base 904 include complementary interference features that locate the interlocking member 902 and mounting base 904 relative to one another in a rotational direction and inhibit or prevent the relative rotation of the interlocking member 902 and the mounting base 904. In the illustrated arrangement, the interference features include a projection 922 and a recess 924, which are generally rectangular in shape but could be other suitable shapes, as well. The projection 922 is positioned on the interlocking member 902 and the recess 924 is located on the mounting base 904; however, these positions could be reversed. The projection 922 and recess 924 locate the interlocking member 902 such that the engaging members or tabs 912 are located in a desirable position relative to corresponding projections or feet 926 on the surface of the mounting base 904 that faces the interlocking member 902. The feet 926 are circumferentially offset from the tabs 912 and contact the tabs 162 of the upper shell piece 102 to provide a stop surface to the rotation of the upper shell piece 102 at a properly aligned position relative to the mounting member 108 when assembled thereto. The illustrated arrangement includes the same number of feet 926 as tabs 912; however, a lesser number of feet 926 could also be used. The circumferential dimension of the feet 926 can be configured such that the feet 926 contact an edge of the access opening 166 to provide some amount of resistance to rotation of the upper shell piece 102 in a directing tending to remove the upper shell piece 102 from the mounting member 108 thereby inhibiting unintentional disconnection of the upper shell piece 102 from the mounting member 108. If desired, active locks could also be provided to prevent unintentional disconnection of the upper shell piece 102 from the mounting member 108.

Figure 10:
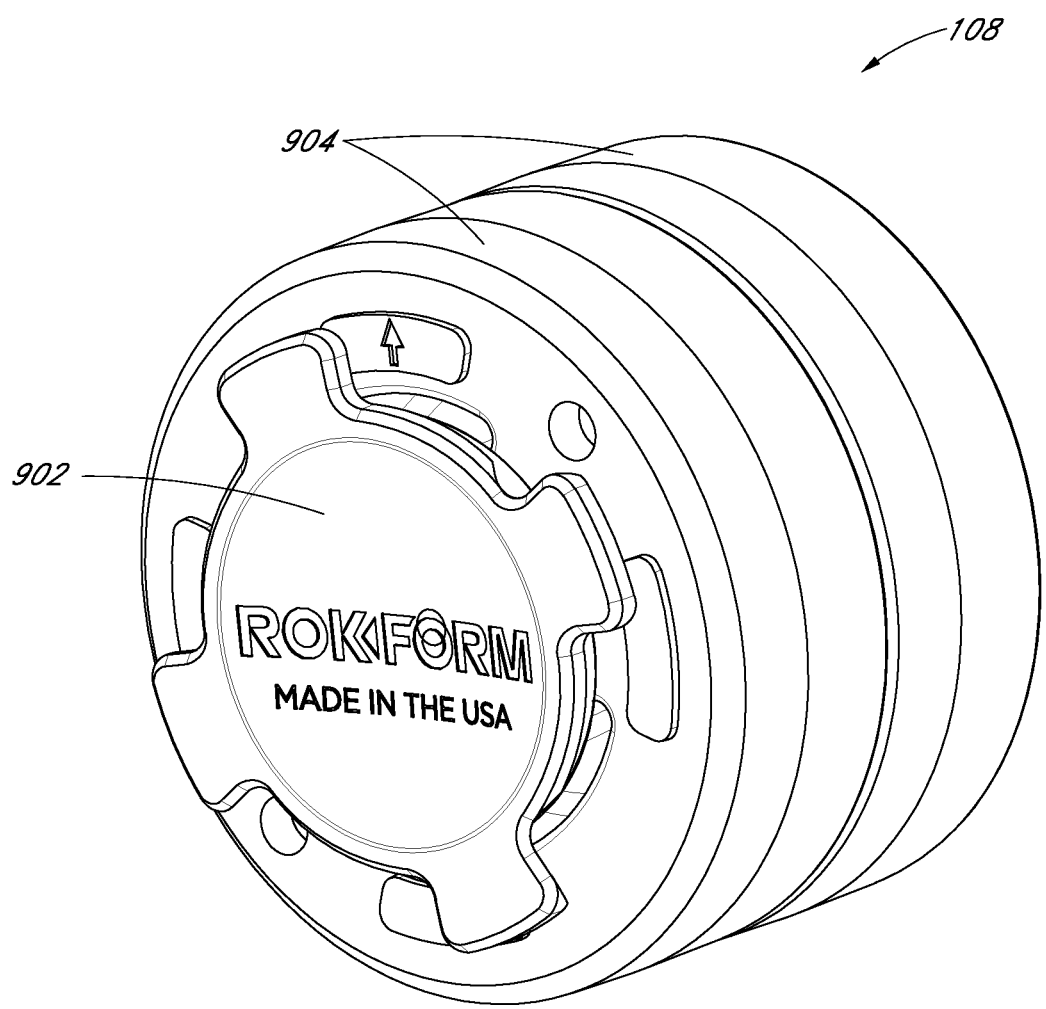
FIG. 10 is a perspective view of an assembled mounting member.

FIG. 10 depicts one embodiment of an assembled mounting member 108 preferably comprised of two mounting bases 904 and an interlocking member 902. In other embodiments, mounting member 108 may be further comprised of additional mounting bases 904 or a spacer, not shown, between the mounting bases.

The side of interlocking member 902 shown in FIGS. 9A and 10 is inserted into the attachment region 106 formed by interlocking surfaces 116 and 126 by aligning the tabs or engaging members 912 of interlocking member 902 with the access openings 166 in the attachment region 106, as seen in FIG. 2. Preferably rotating or twisting mounting member 108 in a clockwise direction results in the tabs or engaging members 912 of interlocking member 902 rotating behind or inside of interlocking surface 126 until further rotational movement is stopped by interaction with interlocking surface 116. This rotational movement of interlocking member 902 results in the rigid yet removable attachment of mounting member 108 to protection system 100. Similarly, rotation or twisting of interlocking member 902 in the opposite direction allows for removal of mounting member 108.

Attachment or detachment of protection system 100 from the mounting member 108 occurs either through rotation of mounting member 108 (resulting in rotation of interlocking member 902) or through rotation of the handheld electronic device within the protection system 100, as when the mounting member 108 is securely attached to another surface.

With reference to FIG. 11, one accessory that may be used with protection system 100 includes a bike mount 1100. The illustrated bike mount 1100 may be mounted on or as a replacement of the top cap of a bicycle steering stem arrangement, preferably using screw 1120. In particular, the bike mount piece 1110 preferably replaces the top cap of a standard bicycle steering headset system and rests on the upper surface of the front fork steerer tube or steering stem spacer. As is known, the top cap is utilized to adjust a preload of the bearings in the bicycle steering headset system. Once the steering stem is clamped to the steerer tube, the top cap is no longer providing any function. The present bike mount 1100 can replace the standard top cap. Preferably, the mount piece 1110 is adjustable (e.g., rotatable) with respect to the bike mount attachment piece 1130. In particular, in the illustrated arrangement, the bike mount attachment piece 1130 includes an arm portion that extends from the mount piece 1110. The arm portion is rotatably coupled to the mount piece 1110 by a pivot assembly. The bike mount attachment piece 1130 may attach to the upper shell piece 102 using the interlocking mounting arrangement discussed above.

Although this application discloses certain preferred embodiments and examples, it will be understood by those skilled in the art that the present inventions extend beyond the specifically disclosed embodiments to other alternative embodiments and/or uses of the invention and obvious modifications and equivalents thereof. Further, the various features of these inventions can be used alone, or in combination with other features of these inventions other than as expressly described above. While the disclosed embodiments are primarily directed to a protection system for a handheld electronic device, aspects of the invention may be used in connection with other types of protection systems. Thus, it is intended that the scope of the present inventions herein disclosed should not be limited by the particular disclosed embodiments described above, but should be determined only by a fair reading of the claims that follow.

What is claimed is:

1. A mountable case for a handheld electronic device, comprising:
a case configured to be selectively connectable to the handheld electronic device and retain the electronic device within an interior space of the case in use, the case comprising a rear portion that is configured to be positioned along a rear surface of the electronic device in use and a side portion extending from the rear portion and being configured to be positioned adjacent at least a portion of a top, bottom, left and right sides of the electronic device in use;
a non-slip region located on the rear portion of the case and comprising a flexible non-slip member that defines at least a portion of an exterior surface of the rear portion of the case, the flexible non-slip member comprising a non-slip material, wherein an interior surface of the flexible non-slip member defines an indentation;
a magnet received within the indentation of the flexible non-slip member such that a rear-facing surface of the magnet is covered by the flexible non-slip member; and
wherein the non-slip region further comprises an open space defined by the case, wherein the non-slip member is shaped to fit within the open space.

2. The case of claim 1, further comprising a cover piece adjacent an inner surface of the magnet that, in use, is located between the magnet and the electronic device.

3. The case of claim 2, wherein the cover piece is made of the same material as the flexible non-slip member.

4. The case of claim 1, wherein the open space of the non-slip region is at least partially defined by a flange formed by the disposition of a smaller opening within a larger opening.

5. The case of claim 4, wherein the flexible non-slip member contains a peripheral groove that engages the flange to removably couple the flexible non-slip member to the case.

6. The case of claim 1, wherein the flexible non-slip member comprises a frictional gripping exterior surface that enhances frictional engagement of the case with a surface on which the case is placed.

7. The case of claim 6, wherein the frictional gripping exterior surface of the flexible non-slip member comprises roughened surface features.

8. The case of claim 1, wherein the magnet is a rare-earth magnet.

9. A mountable case for a handheld electronic device, comprising:
a case configured to be selectively connectable to the handheld electronic device and retain the electronic device within an interior space of the case in use, the case comprising a rear wall that is configured to be positioned along a rear surface of the electronic device in use and a sidewall extending from the rear wall and being configured to be positioned adjacent at least a portion of a top, bottom, left and right sides of the electronic device in use, wherein the rear wall and the sidewall are a unitary structure;
an exterior-facing member configured to be removably received in the rear wall of the case, the exterior facing member having an indentation and at least one magnet received within the indentation, the indentation facing the rear wall of the case, wherein the rear wall of the case and the exterior facing member fully enclose the at least one magnet.

10. The case of claim 9, wherein the exterior-facing member is a non-slip member.

11. The case of claim 10, wherein the non-slip member comprises a frictional gripping exterior surface that enhances frictional engagement of the case with a surface on which the case is placed.

12. The case of claim 9, wherein the magnet is removable from the exterior-facing member.

13. The case of claim 9, wherein the attachment region further comprises an open space configured to receive an interlocking member.

14. The case of claim 13, wherein the open space comprises four access spaces configured to receive corresponding tabs of an interlocking member.

15. A mountable case for a handheld electronic device, comprising:
a case configured to be selectively connectable to the handheld electronic device and retain the electronic device within an interior space of the case in use, the case comprising a rear wall that is configured to be positioned along a rear surface of the electronic device in use and a sidewall extending from the rear wall and being configured to be positioned adjacent at least a portion of a top, bottom, left and right sides of the electronic device in use, wherein the rear wall and the sidewall are a unitary structure;
an attachment region on the rear portion of the case, the attachment region comprising:
an open space defining an interlock area, the interlock area being sized and shaped to receive a corresponding interlocking member, wherein the interlock area has four access spaces sized to receive corresponding tabs of the interlocking member when the interlocking member is attached to the mountable case; and
an exterior facing member configured to be removably received in a cavity in the rear of the case, the exterior facing member having an indentation and at least one magnet received within the indentation, the indentation facing the rear wall of the case, wherein the rear wall of the case and the exterior facing member fully enclose the at least one magnet.

16. The case of claim 15, wherein the exterior-facing member is a non-slip member.

17. The case of claim 15, wherein the at least one magnet is removable from the exterior-facing member.

* * * * *